United States Patent

[11] 3,631,265

| [72] | Inventor | Donald E. Henry |
| | | Davenport, Iowa |
| [21] | Appl. No. | 812,483 |
| [22] | Filed | Sept. 27, 1968 |
| [45] | Patented | Dec. 28, 1971 |
| [73] | Assignee | Gulf & Western Industries, Inc. |
| | | New York, N.Y. |

[54] CONFLICTING SIGNAL ERROR DETECTOR FOR PROCESS CONTROL SYSTEM
4 Claims, 4 Drawing Figs.

[52] U.S. Cl. ..................................................... 307/252 B,
307/275, 307/293, 307/305
[51] Int. Cl. ........................................................ H03k 17/26
[50] Field of Search ............................................. 307/252,
293, 275, 305, 216, 252 B

[56] References Cited
UNITED STATES PATENTS

| 3,508,078 | 4/1970 | Kumamiya | 307/216 |
| 3,053,995 | 9/1962 | Halleberg | 307/275 |
| 3,471,716 | 10/1969 | Dinger | 307/275 |

*Primary Examiner*—Donald D. Forrer
*Assistant Examiner*—David M. Carter
*Attorney*—Meyer, Tilberry and Body ABSTRACT: There is disclosed herein an error detection system for developing an error signal when the signal received by the input circuit of a solid-state process control circuit means is in conflict with the signal carried by the output circuit thereof.

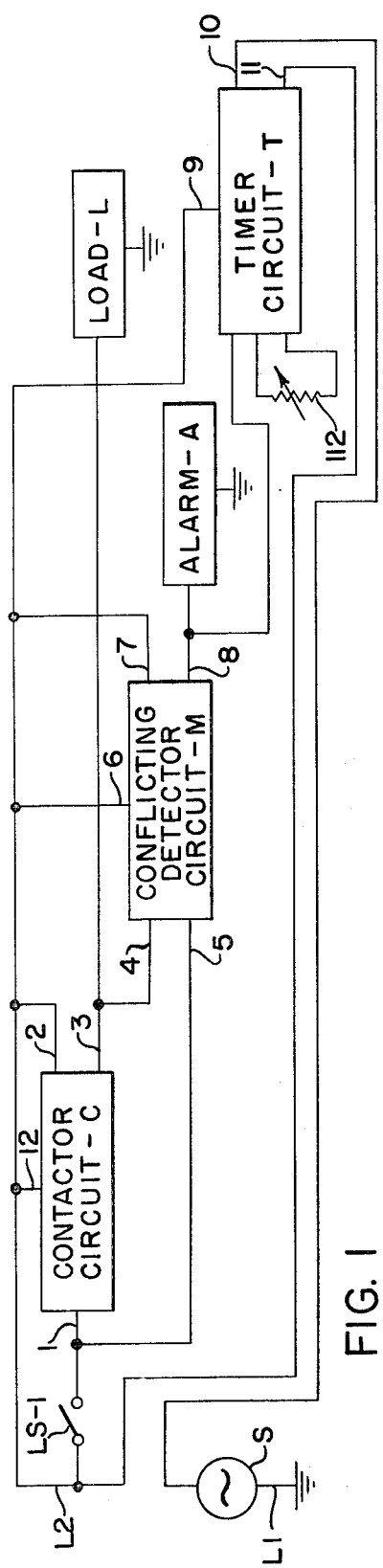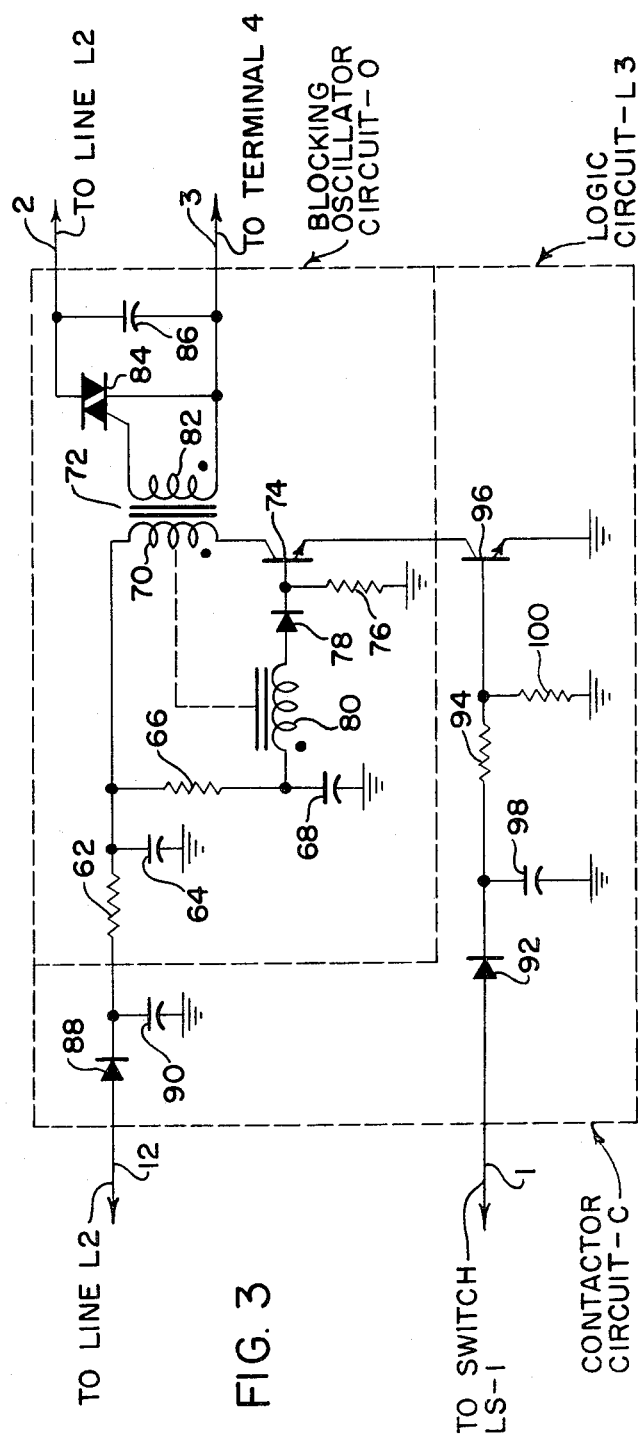

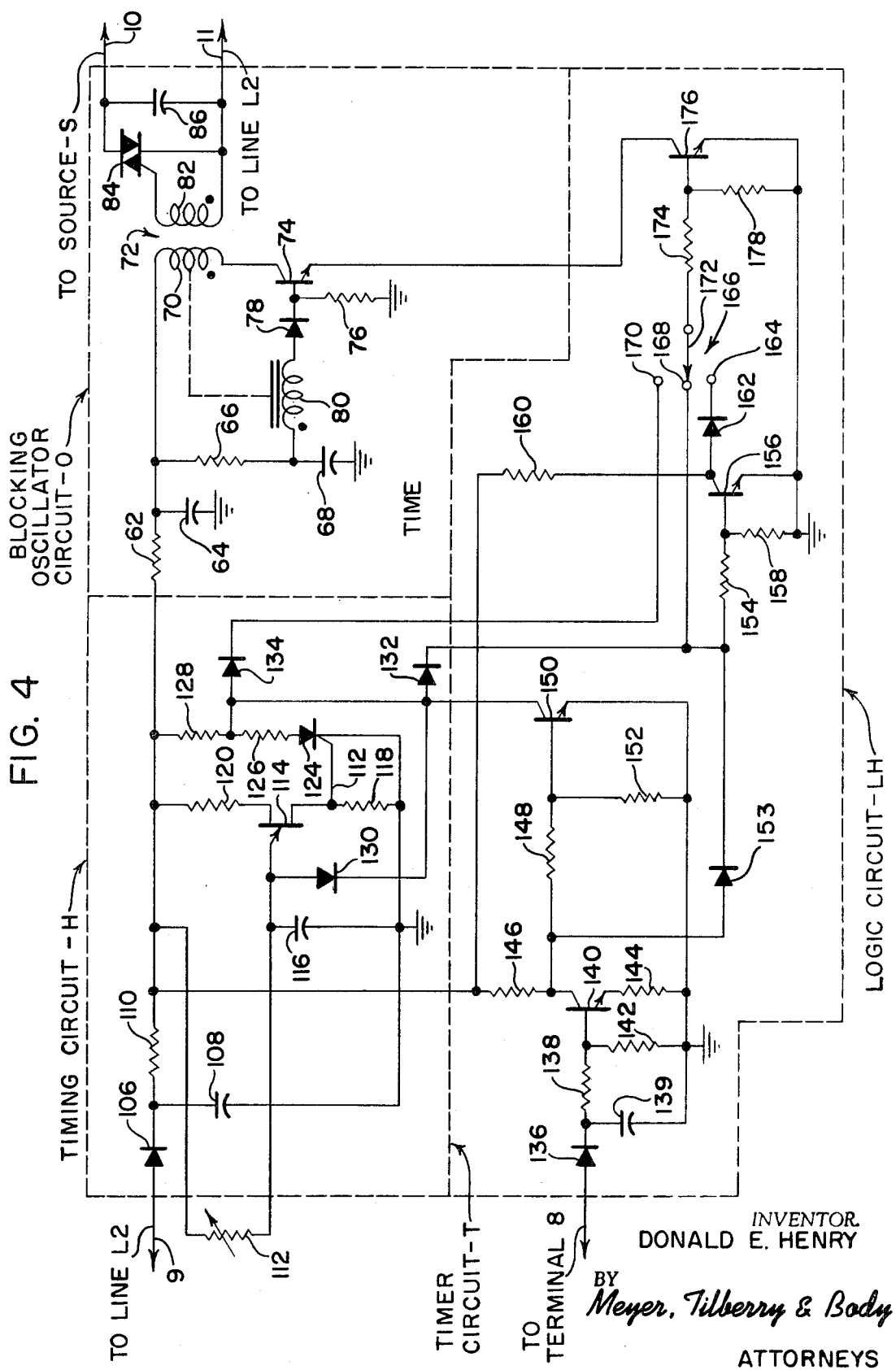

CONFLICTING SIGNAL ERROR DETECTOR FOR PROCESS CONTROL SYSTEM

This invention relates to the art of process control and, more particularly, to means for detecting whether conflicting signals appear at the input and output circuits of a control circuit.

The invention is particularly applicable for removing power from the control system when conflicting signals appear, although the invention is not limited thereto and may be used whenever it is desired to provide an error signal when conflicting signals appear in a process control system.

Frequently, industrial machines, such as a plastic molding machine, which are controlled by a process control system, operate at high velocities and pressures. For example, an injunction plastic molding machine might complete a cycle of operation in approximately two-tenths of a second, and might develop mold pressures of two hundred tons. Because of the high velocities and pressures developed by industrial machines, it is desirable to employ circuits for detecting a conflicting condition. For example, such a condition might be the simultaneous energization of two opposing hydraulic solenoids or the energizing of a solenoid for injecting plastic material prior to the time a mold cavity is closed.

Error detection circuitry known heretofore has taken the form of interconnecting contacts on various relays to prevent the conflicting signals from appearing. With such apparatus, should a relay fail to function, or a contact on a relay weld, the conflicting signals will still result. These relays are normally the same relays that are used for switching the alternating-current line voltage directly to the process control system. Hence, such relay mechanisms were not a true error detection circuit, since they do not serve a separate function with the single purpose of providing an output indication of an error.

The present invention is directed toward a conflicting error detection circuit which serves the independent function of monitoring at least two signals obtained from a process control system and then providing an error signal when the signals are in conflict with each other. This conflicting condition may take the form of a pair of signals being concurrently developed, or upon failure of one or more signals to be developed at one point in the system when a signal is applied at another point in the system.

The present invention contemplates that a process control system serve to control a load, such as a solenoid-operated hydraulic valve system, upon command of a control signal.

In accordance with the present invention, the improvement incorporates solid-state conflicting error detection means which is coupled to the process control system for developing an error signal in response to the failure of the control system to develop a signal at one point in the system upon application of a signal at another point in the control system.

In accordance with a more limited aspect of the present invention, the error signal is employed to actuate an error-indicating means, such as an alarm, to provide a warning signal in the event of conflicting signals within the control system.

In accordance with a further aspect of the present invention, a timing means serves to time a predetermined period of time and then the error signal causes the alternating-current line voltage to be interrupted from the control system.

The primary object of the present invention is to provide a conflicting error detection system which is relatively simple in construction and economical in operation.

Another object of the present invention is to provide an error detection system in which the input signal takes the form of an alternating-current signal, the logic means performs logic functions on a direct-current signal, and the output signal takes the form of an alternating-current signal.

Another object of the present invention is to provide a conflicting signal error detection system which monitors the input signal and the output signal of a control circuit and provides an error signal when a conflicting input and output signal appears.

A further object of the present invention is to provide a conflicting signal error detection system including solid-state logic circuitry to minimize power requirements, as well as to minimize maintenance normally attributed to electromechanical systems.

The foregoing objects and advantages of the invention will become apparent from the following description of the preferred embodiments of the invention as read in conjunction with the accompanying drawings in which:

FIG. 1 illustrates one application of the invention in conjunction with a process control system;

FIG. 3 is a schematic diagram illustrating the contactor circuit as shown in FIG. 1; and, FIG. 4 is a schematic diagram illustrating the timer circuit as shown in FIG. 1.

GENERAL DESCRIPTION

Figure 2:
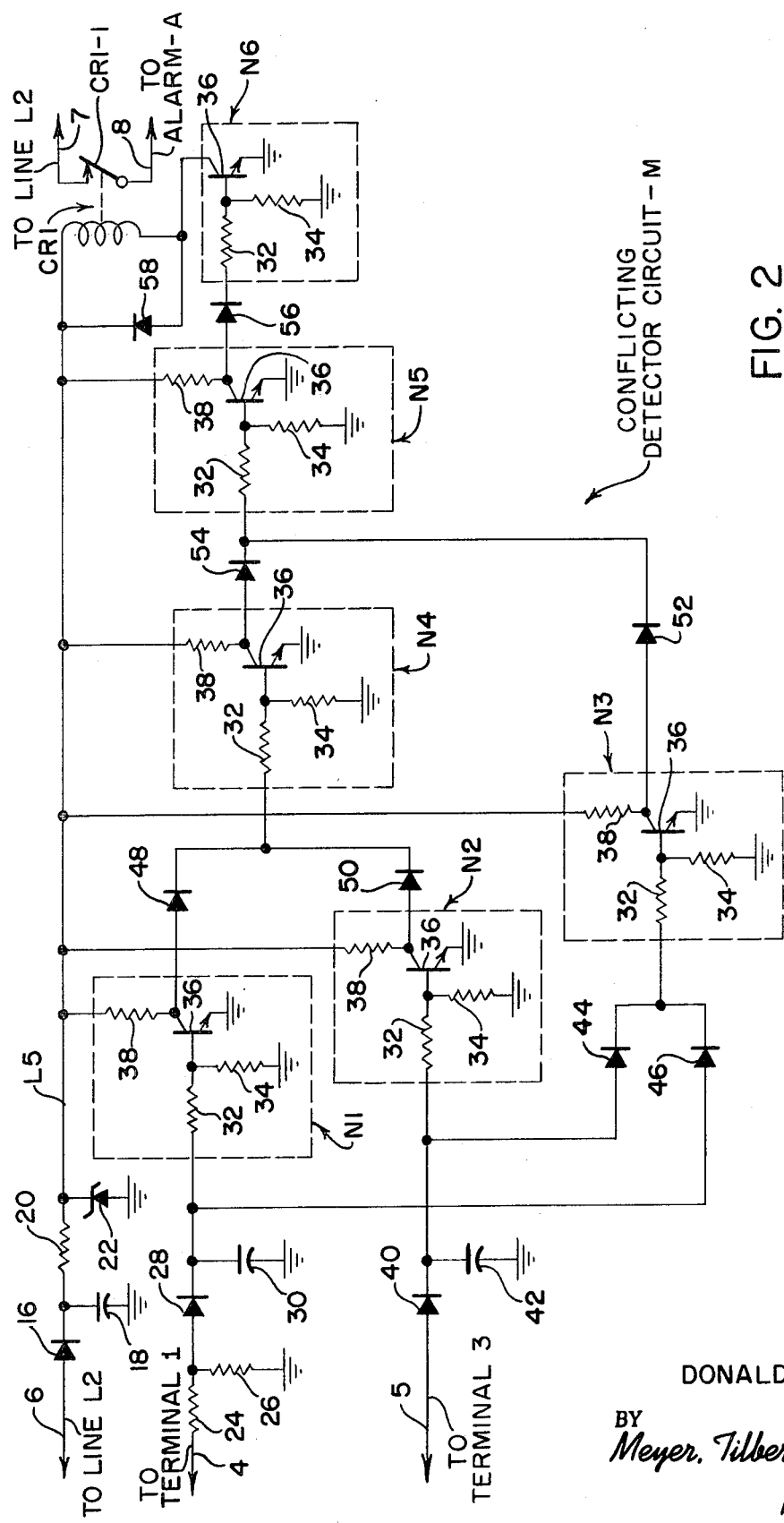
FIG. 2 is a schematic diagram illustrating the preferred embodiment of the conflicting detector circuit shown in FIG. 1.

Referring now to the drawings, which are presented for illustrating preferred embodiments of the present invention only, and not for purposes of limiting same, FIG. 1 illustrates a process control system for controlling the energization of a load L, which load may, for example, take the form of a solenoid-controlled valve system for driving the movable machine member of a plastic molding machine. The control system is preferably actuated by a normally open limit switch LS–1; however, obviously other switching devices or circuits could be employed for providing a signal in response to a machine operation. Normally open limit switch LS–1 is connected between a line L2 and input terminal 1 of a contactor circuit C. One of the output terminals 2 of contactor circuit C is connected directly to line L2, and the other output terminal 3 is connected to load L, and to an input terminal 4 of conflicting detector circuit M. The other input terminal 5 of conflicting detector circuit M is connected to input terminal 1 of contactor circuit C. One of the output terminals 7 of conflicting detector circuit M is connected directly to line L2, and the other output terminal 8 is connected to an alarm A and to an input terminal of a timer circuit T. Timer circuit T includes a pair of output terminals 10 and 11, one of which is connected to one terminal of an alternating-current supply source S, and the other output terminal is connected directly to line L2. The other terminal L1 of supply source S, which source preferably takes the form of a 115 volt alternating-current line supply, is connected directly to ground. Also, the power terminals 6, 9, and 12 of conflicting detector circuit M, timer circuit T, and conflicting detector circuit M are coupled to line L2.

CONFLICTING DETECTOR CIRCUIT

Having now described the process control system generally, reference is now made to FIG. 2, which illustrates conflicting detector circuit M. Terminal 6 of detector circuit M is connected to the anode of a diode 16, having the cathode thereof connected through a capacitor 18 to ground, and through a resistor 20 to a line L5. Line L5 is connected through a Zener diode 22, poled as shown in FIG. 2, to ground.

Terminal 4 of detector circuit M is connected through a pair of series-connected resistors 24 and 26 to ground. The junction between resistors 24 and 26 is connected to the anode of a diode 28 having the cathode thereof connected through a capacitor 30 to ground. The junction between the anode of diode 28 and capacitor 30 is connected to the input terminal of a NOR-gate N1. Conflicting detector circuit M also includes NOR-gates N2, N3, N4, N5 and N6, each of which preferably take the form of an RTL resistor-transistor logic circuit illustrated in FIG. 7.5, on page 178, of the General Electric Transistor Manual, 7th Edition. As shown in FIG. 2, each NOR-gate N1 through N6 includes an input terminal connected through a pair of series-connected resistors 32 and 34 to ground. The junction between resistors 32 and 34 is connected to the base of an NPN-transistor 36 having the emitter thereof connected directly to ground. The collector of transistor 36 of NOR-gates N1 through N5 is connected through a resistor 38 to line L5, and also provides an output terminal.

Terminal 5 of detector circuit M is connected to the anode of diode 40 having the cathode thereof connected through a capacitor 42 to ground. Also, the cathode of diode 40 is connected to the input terminal of NOR-gate N2, and to the anode of a diode 44. Connected to the cathode of diode 44 is the input terminal of NOR-gate N3 and the cathode of a diode 46. The anode of diode 46 is connected directly to the junction between diode 28 and capacitor 30. The output terminals of NOR-gates N1, N2 and N3, are connected to the anodes of diodes 48, 40, and 52, respectively. The cathodes of diodes 48 and 50 are connected in common to the input terminal of NOR-gate N4. The output terminal of NOR-gate N4 is connected to the anode of a diode 54 having the cathode thereof connected in common with the cathode of diode 52 to the input terminal of NOR-gate N5. The output terminal of NOR-gate N5 is connected through a diode 56, poled as shown in FIG. 2, to the input terminal of NOR-gate N6. The collector of transistor 36 of NOR-gate N6 is connected through a diode 58, poled as shown in FIG. 2, to line L5, and through the coil of a relay CR1 to line L5. Relay CR1 includes a set of normally open contacts CR1-1 which provide the output terminals 7, 8 of conflicting detector circuit M.

CONTACTOR CIRCUIT

Having now described the conflicting detector circuit M, reference is now made to FIG. 3 which more particularly illustrates contactor circuit C, which includes a blocking oscillator circuit O and a logic circuit L3. Contactor circuit C preferably takes the form of the circuit disclosed in U.S. Pat. Application, Ser. No. 730,212, entitled "High Temperature Semiconductor Switching Circuit," and filed on Apr. 12, 1968.

Blocking oscillator circuit O includes a resistor 62 having one terminal connected to one terminal of logic circuit L3, and the other terminal is connected through a capacitor 64 to ground. Connected to the junction between resistor 62 and capacitor 64 is one terminal of a resistor 66 having the other terminal thereof connected through a capacitor 68 to ground. Also connected to the junction between resistor 62 and capacitor 64 is one terminal of a primary winding 70 of a transformer 72. Connected to the output terminal, or the positive-polarity indicated end, of primary winding 70 is the collector of an NPN-transistor 74 having the base thereof connected through a resistor 76 to ground. Also connected to the base of transistor 74 is the cathode of a diode 78 having its anode connected to one terminal of a feedback winding 80 of transformer 72. The other terminal, or the positive-polarity indicated end of feedback winding 80 is connected directly to the junction between resistor 66 and capacitor 68. The emitter of transistor 74 is connected to the other terminal of logic circuit L3. One terminal of a secondary winding 82 of transformer 72 is connected to the control electrode of a triac 84, and the other terminal of secondary winding 82, or the positive-polarity indicated end, is connected directly to a first terminal of triac 84 and to one terminal of a capacitor 86. The second terminal of triac 84 is connected to the other terminal of capacitor 86, and the first and second terminals of triac 84 provide output terminals 3 and 2, respectively, of contactor circuit C.

Logic circuit L3 includes a diode 88 having the anode thereof connected directly to line L2, and the cathode connected through a capacitor 90 to ground, and to resistor 62 in blocking oscillator circuit O. Input terminal 1 of logic circuit L3 is connected to the anode of a diode 92 having the cathode thereof connected through a resistor 94 to the base of an NPN-transistor 96. The junction between diode 92 and resistor 94 is connected through a capacitor 98 to ground, and the base of transistor 96 is also connected through a resistor 100 to ground. The emitter of transistor 96 is connected directly to ground, and the collector of this transistor is connected to the emitter of transistor 74 in blocking oscillator circuit O.

TIMER CIRCUIT

Having now described contactor circuit C, reference is now made to FIG. 4 which more particularly illustrates timer circuit T. Timer circuit T preferably takes the form of the circuit disclosed in U.S. Pat. Application, Ser. No. 812,487, entitled "Solid-State Time-Delay Switching Circuit," and filed on Sept. 27, 1968. Timer circuit T generally includes a timing circuit H connected through a logic circuit L4 and blocking oscillator circuit O to the control electrode of a triac 84.

Blocking oscillator circuit O is quite similar to that circuit shown in FIG. 3, accordingly, like components in both figures are identified with like character references, and the discussion of that circuit is equally applicable to the blocking oscillator circuit O of timer circuit T.

Timing circuit H includes an input terminal 9 connected to the anode of a diode 106, having the cathode thereof connected through a capacitor 108 to ground, and through a resistor 110 to one terminal of a potentiometer 112. The other terminal of potentiometer 112 is connected directly to the base of a unijunction transistor 114, and is also connected through a capacitor 116 to ground. The first base of unijunction transistor 114 is connected through a resistor 118 to ground, and the second base of this transistor is connected through a resistor 120 to the junction between resistor 110 and potentiometer 112. Also connected to the first base of unijunction transistor 114 is a control electrode 112 of a silicon controlled rectifier 124. The cathode of silicon-controlled rectifier 124 is connected directly to ground, and the anode of this device is connected through a pair of series-connected resistors 126 and 128 to the junction between resistor 110 and potentiometer 112.

Connected to the base of unijunction transistor 114 is the anode of a diode 130 having its cathode connected to the anode of a diode 132. The anode of diode 132 is also connected to the junction between resistors 126 and 128, and to the anode of a diode 134.

Logic circuit L4 includes an input terminal 8 connected to the anode of a diode 136 having the cathode thereof connected through a resistor 138 to the base of an NPN-transistor 140, and through a capacitor 139 to ground. The base and emitter of transistor 140 are connected through resistors 142 and 144, respectively, to ground. The collector of transistor 140, is connected through a resistor 146 to the junction between resistor 110 and potentiometer 112. Also connected to the collector of transistor 140 is one terminal of a resistor 148, having the other terminal thereof connected directly to the base of an NPN-transistor 150. The base of transistor 150 is also connected through a resistor 152 to ground, and the emitter of this transistor is connected directly to ground. The collector of transistor 150 is connected to the anode of diode 134.

Also connected to the collector of transistor 140 is the anode of a diode 153 having its cathode connected through a resistor 154 to the base of an NPN-transistor 156. The base of transistor 156 is also connected through a resistor 158 to ground, and the emitter of this transistor is connected directly to ground. The collector of transistor 156 is connected through a resistor 160 to the junction between resistor 110 and potentiometer 112. Also connected to the collector of transistor 156 is the anode of a diode 162 having its cathode connected to terminal 164 of a rotary-type switch 166. Terminal 168 of rotary switch 166 is connected to the junction between diode 153 and resistor 154, and to the cathode of diode 132. Terminal 170 of switch 166 is connected directly to the cathode of diode 134. The movable arm 172 of switch 116 is connected through a resistor 174 to the base of an NPN-transistor 176, and through a resistor 178 to ground. The emitter of transistor 176 is connected directly to ground, and the collector of this transistor is connected to the emitter of transistor 74 in blocking oscillator O.

GENERAL OPERATION

Upon closure of normally open limit switch LS-1, the input terminal of contactor circuit C is connected to alternating-current supply source S through the normally closed output terminals 10, 11 of timer circuit T. When the alternating-voltage signal is applied to input terminal 1, contactor circuit C is actuated to thereby energize load L. Conflicting detector circuit M is coupled to input terminal 1 and output terminal 3 of contactor circuit C, and in the event a signal is applied to input terminal 1 and no signal appears at output terminal 3, for example, triac 84 of contactor circuit C fails to switch, detector circuit M provides an output signal to thereby energize alarm A. When an output signal is developed at terminal 8 of detector circuit M, a signal is applied to timer circuit T, thereby commencing a timing cycle of operation. After a predetermined period of time, the circuit between terminals 10 and 11 of timer circuit T changes from a "closed" circuit to an "open" circuit to thereby disconnect the entire process control system from the alternating-current supply source S.

OPERATION OF BLOCKING OSCILLATOR CIRCUIT

The signal supplied by alternating-current supply source S is rectified through diode 88, capacitor 90, resistor 62, and capacitor 64, to thereby provide a direct-current signal which will charge capacitor 68 through resistor 66, and will also cause transformer 72 to begin to store energy in primary winding 70. As energy is gradually stored in primary winding 70 a positive voltage of increasing amplitude is induced in feedbacking winding 80 of the polarity indicated with reference to the polarity dot. The voltage induced in feedback winding 80 is applied through diode 78 to gradually forward bias transistor 74 into conduction. Once transistor 74 commences to conduct, capacitor 68 rapidly discharges through primary winding 70 and transistors 74 and 96 to ground, assuming the latter transistor is forward biased into conduction.

When capacitor 68 discharges through primary winding 70, a voltage impulse of short duration is developed across primary winding 70 which in turn induces a similar pulse in secondary winding 82, to thereby apply a short duration gating signal to the control electrode of triac 84. This gating signal causes triac 82 to switch from an "off" to an "on" condition. In the "on" condition a closed path is completed between output terminals 2 and 3, which path will be maintained until the signal developed by voltage supply source S passes through approximately a zero-voltage level. Because the gating pulse is of a very short duration, excessive current is not applied to the control electrode of triac 84, and operation at high temperatures is made possible.

Also, upon saturation of the core of transformer 72, the induced current through feedback winding 80 terminates, and the forward biasing signal applied to transistor 74 terminates, to thereby cause this transistor to again become reverse biased. Once transistor 74 becomes reverse biased, capacitor 86 will again begin to charge to thereby commence another cycle of operation. When transistor 96 is reverse biased, the oscillator circuit including transistor 74 will cease to oscillate since there will be no path for the discharge of capacitor 68. Transistor 96 is actuated by the signal supplied from logic circuit L3.

OPERATION OF CONTACTOR CIRCUIT

Prior to the application of an alternating-current signal to input terminal 1 of contactor circuit C, i.e., prior to closure of normally open limit switch LS-1 transistor 96 is reverse biased thereby preventing oscillator circuit O from oscillating. In this condition, the circuit between terminals 2 and 3 of contactor circuit C takes the form of an "open" circuit. Upon application of an alternating-current signal to input terminal 1 of contactor circuit C, i.e., after closure of limit switch LS-1, transistor 96 will become forward biased to thereby cause oscillator circuit O to commence oscillation, and the circuit between output terminals 2 and 3 will taken the form of a "closed" circuit.

OPERATION OF TIMER CIRCUIT

If no signal is developed at output terminal 8 of conflicting detector circuit M, transistor 140 is reverse biased to thereby cause transistors 150 and 156 to become forward biased. When transistor 150 is forward biased, capacitor 116 will discharge and remain in a discharged condition through diode 130 and transistor 150. Since transistor 140 is reverse biased, and transistor 150 is forward biased, a binary "1" signal will appear at terminal 168, and a binary "0" signal will appear at terminal 164, respectively, of switch 166. By a binary "0" signal is meant a signal equal to approximately ground potential, and a binary "1" signal is meant a signal of some positive potential. Since the anode of diode 134 is effectively grounded through transistor 150, the signal appearing at the cathode of diode 134, i.e., terminal 170 of switch 166, will be a binary "0" signal.

When an alternating-current error signal is developed at output terminal 8 of detector circuit M, this signal is rectified by diode 136 and capacitor 139, and is applied to the base of transistor 140 to forward bias this transistor into conduction, thereby commencing a timing cycle. When transistor 140 becomes forward biased, transistor 150 will become reverse biased to thereby allow capacitor 116 to commence charging through potentiometer 112. As may be readily apparent, the impedance of potentiometer 112 may be varied to alter the timing cycle of operation. During the timing operation, transistor 156 will remain in a conductive state since a binary "1" signal is applied to the base thereof through resistor 128, diode 132, and resistor 154. Since transistor 156 remains in a conductive condition, the signal appearing at terminal 164 of switch 166 will remain at a binary "0" signal level. When transistor 150 becomes reverse biased, a binary "1" signal will appear at the anode of diode 132 to thereby apply a binary "1" signal to terminal 168 of switch 166. Similarly, a binary "1" signal will appear at the anode of diode 134 to thereby cause the signal at terminal 170 of switch 166 to change from a binary "0" signal to a binary "1" signal.

When the voltage developed across capacitor 116 attains a level sufficient to cause unijunction transistor 114 to fire or "avalanche," a voltage will be developed across resistor 118 to thereby gate silicon controlled rectifier 124 into conduction. When silicon controlled rectifier 124 becomes conductive, a binary "0" signal will be applied to the anode of diodes 132 and 134. Since transistor 140 remains in a conductive state after the completion of a timing cycle, a binary "0" signal will be applied to the anode of diode 152. With a binary "0" signal applied to the anodes of diodes 132, 134 and 152, a binary "0" signal will appear at terminals 168 and 170 of switch 166. Transistor 156 will be reverse biased and a binary "1" signal will appear at terminal 164 of switch 166.

When a binary "0" signal appears at terminal 164 of switch 166, assuming movable arm 172 is in the position as illustrated in FIG. 4, a binary "0" signal will be applied to the base of transistor 176 thereby reverse biasing this transistor. If a binary "1" signal appears at terminal 164 of switch 166, transistor 176 will be forward biased into conduction, thereby commencing oscillation of blocking oscillator circuit O.

Thus, with movable arm 172 of switch 166 in the position as illustrated in FIG. 4, the circuit across output terminals 10 and 11 of timer circuit T takes the form of a "closed" circuit prior to timing and during timing, and an "open" circuit after the timing cycle.

OPERATION OF CONFLICTING DETECTOR CIRCUIT

Prior to the application of alternating current signals to terminals 4 and 5 of conflicting detector circuit M, i.e., nonconflicting signals prior to closure of normally open limit switch LS-1, transistors 36 of NOR-gates N1, N2 and N3 are reverse biased thereby applying a binary "1" signal to the anodes of diodes 48, 50 and 52, respectively. The binary "1" signals applied to the anodes of diodes 48 and 50 cause transistor 36 of NOR-gate N4 to become forward biased thereby applying a binary "0" signal to the anode of diode 54. With a binary "0" signal applied to the anode of diode 54 and a binary "1" signal applied to the anode of diode 52, a binary "1" signal will be applied to the base of transistor 36 of NOR-gate N5, thereby forward biasing this transistor into conduction. When transistor 36 of NOR-gate N5 becomes conductive, a binary "0" signal is applied through diode 56 to the base of transistor 36 of NOR-gate N6, thereby reverse biasing this transistor. When transistor 36 of NOR-gate N6 becomes reverse biased, the coil of relay CR1 will remain deenergized thereby causing contacts CR1–1 to remain open.

When alternating-current signals are applied to terminals 4 and 5 of detector circuit M, i.e., when limit switch LS–1 is closed and contactor circuit C is operating normally, a binary "1" through N3, binary "0" signals will be applied to NOR-gates N1, N2, and N3. When a binary "1" signal is applied to NOR-gates N1 through N3, binary "0" signals will be applied to the anodes of diodes 48, 50 and 52. With binary "0" signals applied to the anodes of diodes 48 and 50, a binary "0" signal will be applied to the base of transistor 36 of NOR-gate N4 to thereby cause a binary "1" signal to be applied to the anode of diode 54. With a binary "1" signal applied to the anode of diode 54, and a binary "0" signal applied to the anode of diode 52, a binary "1" signal will be applied to the base of transistor 36 of NOR-gate N5 to thereby cause this transistor to become forward biased. When transistor 36 of NOR-gate N5 becomes forward biased, a binary "0" signal will be applied through diode 56 to the base of transistor 36 of NOR-gate N6 thereby causing this transistor to remain reverse biased. With transistor 36 of NOR-gates N6 reverse biased, the coil of relay CR1 will remain deenergized, thereby causing normally opened contacts CR1–2 to remain open.

When an alternating-current signal is applied to terminal 4 and no signal is applied to terminal 5, i.e., a conflicting signal condition of the preferred embodiment, the alternating-voltage signal will be rectified through diode 28 and capacitor 30 to thereby cause a binary "1" signal to be applied to the base of transistor 36 of NOR-gate N1, and to the anode of diode 46. With no signal applied to terminal 3, a binary "0" signal will be applied to the base of transistor 36 of NOR-gate N2 and to the anode of diode 44. Upon application of a binary "0" signal to the anode of diode 44, and a binary "1" signal to the anode of diode 46, a binary "1" signal will be applied to the base of transistor 36 of NOR-gate N3 thereby forward biasing this transistor into conduction. With a binary "1" signal applied to NOR-gate N1 and N3, a binary "0" signal will be applied to the anodes of diodes 48 and 52, respectively. Also, with a binary "0" signal applied to the base of transistor 36 of NOR-gate N2, a binary "1" signal will be applied to the anode of diode 50. When a binary "0" signal is applied to the anode of diode 48, and a binary "1" signal is applied to the anode of diode 50, a binary "1" signal will be applied to NOR-gate N4 thereby causing a binary "0" signal to be applied to the anode of diode 54. With a binary "0" signal applied to the anodes of diodes 52 and 54, a binary "0" signal will be applied to transistor 36 of NOR-gate N5 thereby causing a binary "1" signal to be applied through diode 56 to the base of transistor 36 of NOR-gate N6. When a binary "1" signal is applied to transistor 36 of NOR-gate N6, the lower portion of the coil of relay CR1 is effectively grounded to energize relay CR1 thereby causing contacts CR–2 to close.

When an alternating-voltage signal is applied to terminal 5 and no signal is applied to terminal 4, the alternating-voltage signal applied to terminal 5 will be rectified through diode 40 and capacitor 42 to thereby cause a binary "1" signal to be applied to NOR-gate N2 and the anode of diode 44. With no signal applied to terminal 1, a binary "0" signal will be applied to NOR-gate 1 and to the anode of diode 46. With a binary "0" signal applied to the anode of diode 46, and a binary "1" signal applied to the anode of diode 44, a binary "1" signal will be applied to NOR-gate N3. When a binary "0" signal is applied to NOR-gate N1, a binary "1" signal is applied to NOR-gates N2 and N3, a binary "1" signal will be applied to the anode of diode 48 and binary "0" signals will be applied to the anodes of diodes 50 and 52. With a binary "1" signal applied to the anode of diode 48, and a binary "0" signal applied to the anode of diode 50, a binary "1" signal will be applied to NOR-gate N4 thereby causing a binary "0" signal to be applied to the anode of diode 54. Upon application of binary "0" signals to the anodes of diodes 52 and 54, a binary "0" signal will be applied to NOR-gate N5 thereby causing a binary "1" signal to be applied through diode 56 to transistor 36 of NOR-gate N6. When a binary "1" signal is applied to transistor 36 of NOR-gate N6, the transistor will become forward biased thereby effectively grounding the lower portion of the coil of relay CR1. When the lower portion of the coil of relay CR1 is grounded, the coil will become energized thereby causing contacts CR1–1 to close. Table I below indicates the condition of relay contacts CR1–1 upon application of various signals to input terminals 4 and 5 of conflicting detector circuit M.

TABLE 1

| Signal applied to (terminal) | | Condition of relay contacts CR1–1 |
|---|---|---|
| 4 | 5 | |
| "0" | "0" | "Open". |
| "1" | "1" | Do. |
| "1" | "0" | "Closed". |
| "0" | "1" | Do. |

As is readily apparent, the bias voltage applied to transistors 36 of NOR-gates N1, N2, and N3 could be adjusted such that the detector circuit would provide an output when both of the input signals were of a positive polarity but of different signal levels. Thus, instead of applying an alternating-current signal to one of the input terminals and no signal to the other of the terminals to cause relay CR1 to become energized, a first level positive signal might be applied to one terminal and a second level positive signal might be applied to the other terminal to cause the relay to become energized.

Also, the coil of relay CR1 could be connected in the collector circuit of transistor 36 of NOR-gate N5 to thereby cause relay contacts CR1–1 to operate in a reverse manner from that shown in table I above, and with this circuit arrangement, the error signal would be developed when no signal is applied and when an alternating-current signal is applied to both input terminals.

Although the invention has been shown in connection with a preferred embodiment, it will be readily apparent to those skilled in the art that various changes in form and parts may be made to suit requirements without departing from the spirit and scope of the invention as defined in the appended claims.

I claim:

1. In a process control system for controlling a plurality of operations, a solid-state alternating-current control circuit means including an input terminal adapted for receiving input alternating-current signals having either a lower level or an upper level and an output circuit means for carrying output alternating-current signals of first or second level, one being the upper level and the other being the lower level, said control circuit means including solid-state means having an input connected to said input terminal for actuating said alternating-control circuit means in response to an upper level signal at said input terminal; and, conflicting-signal detector means coupled to said alternating-current control circuit means for developing an error signal when said input terminal receives a signal of different level from that carried by said output circuit means;

said alternating-current control circuit means also including solid state direct-current to alternating-current converter means with a static switching means having a first, second and control electrode, and exhibiting the characteristic of presenting a low impedance to the flow of an alternating current from the voltage source supply when a forward biasing signal is applied to said control electrode of said static switching means, said first and second electrodes of said static switching means being adapted to carry said output alternating-current signals, and said control electrode of said switching means being coupled to said input terminal;

said signal detector means including solid state logic means with an input from said input terminal and from said output means of said alternating-current control circuit means, including a circuit means for receiving a plurality of input alternating-current signals, each having a first level or a second level, solid state direct-current logic means coupled to said circuit means of said signal detector means for providing a direct-current output signal in response to the receipt of a first level input signal and a second level input signal by said detector circuit means; and including direct-current to alternating-current converter means for providing a said error signal in response to the receipt of a said direct-current output signal from said logic means, said static switching means being a triac, and said logic means of said detector means being a NOR circuit logic means.

2. In a process control system as defined in claim 1 wherein said detector means includes at least a first and a second input circuit means each for receiving a first and a second input alternating current signal each having a first or a second level; solid-state direct current logic means coupled to each of said input circuit means for providing a said direct-current output signal when said first input signal is at said first level and said second input signal is at said second level.

3. In a process control system as defined in claim 2 including error signal warning means responsive to said error signal for providing a warning signal.

4. In a process control system as defined in claim 3 including a timer circuit means responsive to said error signal for interrupting a said alternating current supplied to said process control circuit means at a predetermined period of time after said error signal is developed.

* * * * *